United States Patent
Kaufmann et al.

(10) Patent No.: US 9,074,930 B2
(45) Date of Patent: Jul. 7, 2015

(54) SPECTROMETER AND METHOD OF OPERATING SAME

(71) Applicant: SICK AG, Waldkirch (DE)

(72) Inventors: Jurgen Kaufmann, Waldkirch (DE); Thomas Beyer, Waldkirch (DE); Julian Edler, Waldkirch (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 14/220,313

(22) Filed: Mar. 20, 2014

(65) Prior Publication Data
US 2014/0299774 A1 Oct. 9, 2014

(30) Foreign Application Priority Data
Apr. 3, 2013 (EP) .................... 13162144

(51) Int. Cl.
| | |
|---|---|
| *G01J 3/10* | (2006.01) |
| *G01J 1/42* | (2006.01) |
| *G01J 3/42* | (2006.01) |
| *G01J 3/02* | (2006.01) |

(52) U.S. Cl.
CPC ............... *G01J 3/108* (2013.01); *G01J 1/4257* (2013.01); *G01J 3/42* (2013.01); *G01J 3/0229* (2013.01)

(58) Field of Classification Search
CPC ............. G01J 3/02; G01J 3/0291; G01J 3/10; G01J 3/108; G01N 21/35
USPC ................................................... 250/339.07
See application file for complete search history.

(56) References Cited

U.S. PATENT DOCUMENTS

| | | | |
|---|---|---|---|
| 5,317,156 A * | 5/1994 | Cooper et al. ................. 250/345 |
| 2003/0057373 A1* | 3/2003 | DiDomenico et al. ..... 250/338.5 |
| 2003/0081321 A1* | 5/2003 | Moon et al. ................... 359/619 |
| 2003/0152307 A1* | 8/2003 | Drasek et al. ................... 385/12 |
| 2004/0125361 A1 | 7/2004 | Riza |
| 2004/0195511 A1* | 10/2004 | Elmore et al. ........... 250/339.02 |
| 2004/0246477 A1* | 12/2004 | Moon et al. ................... 356/300 |

(Continued)

FOREIGN PATENT DOCUMENTS

| | | |
|---|---|---|
| DE | 3602139 A1 | 7/1987 |
| DE | 102011082466 B3 | 10/2012 |
| WO | 0062024 A1 | 10/2000 |

(Continued)

OTHER PUBLICATIONS

Search Report issued in European Patent Application No. 13162144. 3, 6 pages.

*Primary Examiner* — Marcus Taningco
(74) *Attorney, Agent, or Firm* — Nath, Goldberg & Meyer; Jerald L. Meyer; Stanley N. Protigal

(57) ABSTRACT

A spectrometer has a first and second light sources (12, 14) which generate light radiation (24) in a first and second wavelength ranges, and a mirror unit (16) for deflecting the light radiation (24, 26) into a measurement path (18), arranged so that the radiation of both wavelength ranges (24, 26) runs through on the same optical path. A detector (20) detects radiation (24, 26) running through the measurement path (18) and an evaluation unit (22) evaluates the radiation (24, 26) incident at the detector (20) and for determining a concentration of a measurement gas component present in the measurement path (18). The mirror unit (16) is configured as a micromirror array (32) and that a single micromirror (34) only deflects a portion of the radiation (24, 26).

13 Claims, 3 Drawing Sheets

(56) References Cited

U.S. PATENT DOCUMENTS

Figure 1:
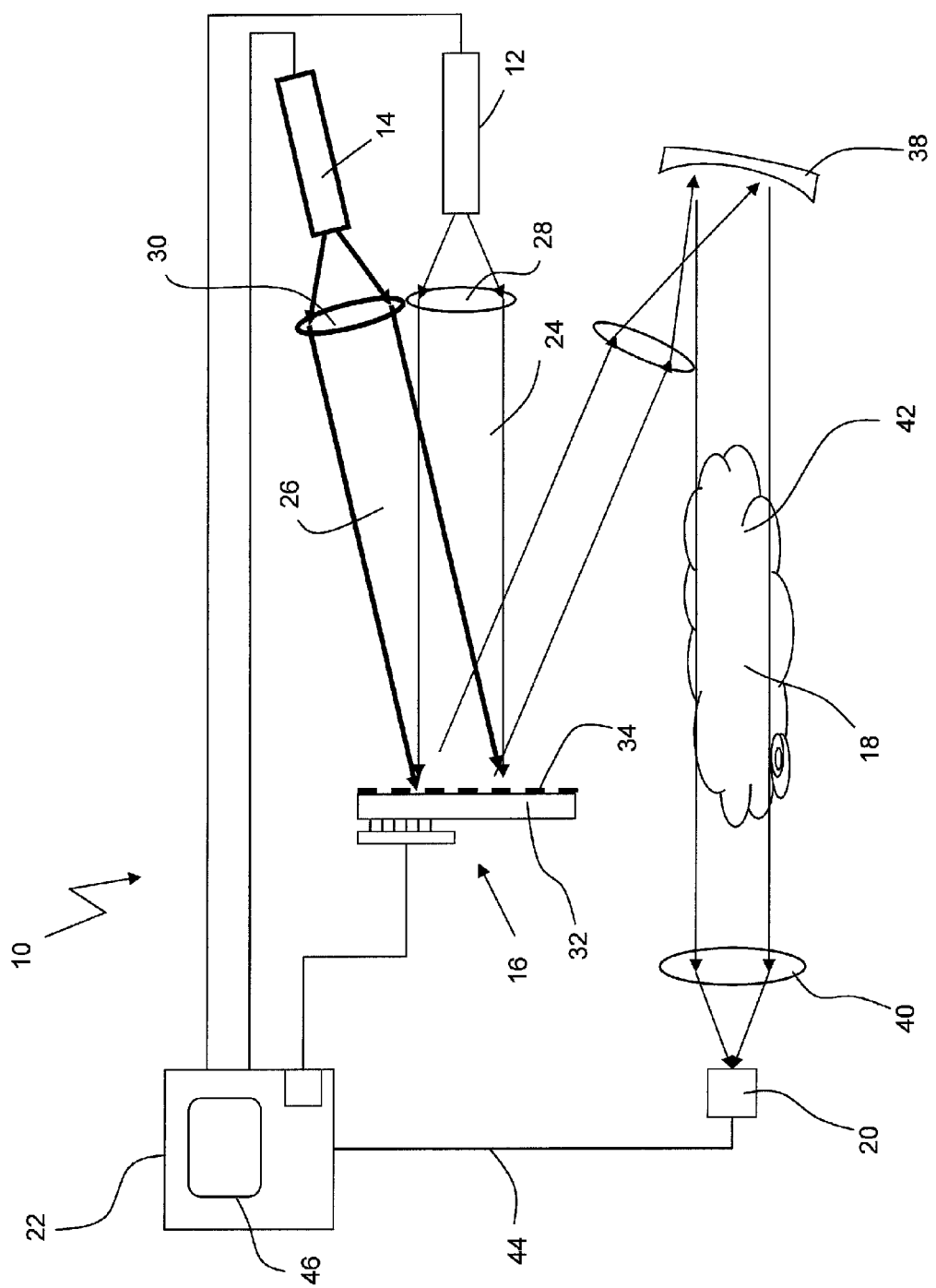

2005/0185179 A1* 8/2005 Wang .......................... 356/328
2006/0044556 A1 3/2006 Kawano

FOREIGN PATENT DOCUMENTS

| WO | 2005036112 A1 | 4/2005 |
| WO | 2010125344 A1 | 11/2010 |

* cited by examiner

SPECTROMETER AND METHOD OF OPERATING SAME

The invention relates to a spectrometer in accordance with the preamble of claim 1 and to a method of operating such a spectrometer.

Spectrometers in the industrial sector, for which the invention is intended, are as a rule designed with one channel, i.e. one optical channel having a light source, having a measurement path and having a light detector is available. It is usually a question of absorption spectrometers with which a concentration of a measurement gas component of a measurement gas is determined over a spectral absorption.

Spectrometers are, however, also known in which wavelengths which can only be achieved with a plurality of light sources, usually laser diodes, are necessary for measuring different measurement gas components. It is known for this purpose to couple in the light of the different laser diodes via color splitter mirrors, geometrically splitting mirrors or via reflection diffraction gratings. The lasers are in this respect controlled in time multiplex operation to be able to associate the detector signal to the individual laser wavelengths, that is to the absorption bands.

This has the disadvantage that splitter mirror arrangements have high light losses, that the optical components such as splitter mirrors or reflection diffraction gratings are expensive and in particular that a high effort is required to stabilize the lasers thermally in time multiplex operation. Since the lasers always have to be thermally tuned to the working point again on switching over, only small switchover rates are possible.

A further solution would be to provide a parallel beam guidance in two optical channels, which, however, results in twice the construction volume and twice the costs.

A spectrometer is known from WO 00/62024 which has a broadband light source. The white light of the light source passes through the measurement path and a spectral division only take place behind the measurement path by means of a reflection diffraction grating. So that each of the wavelengths resolved by the diffraction grating can be directed to only one detector, a micromirror array is arranged behind the diffraction grating with which the spatially resolved light beams of different wavelengths can be directed onto the one detector. This has the disadvantage that such an arrangement is not suitable for the use of monochromatic light sources such as lasers which use is standard today due to the light yield and the accompanying possible sensitivity. There are furthermore also the above-named disadvantages with respect to the use of a diffraction grating.

Starting from this prior art, it is the object of the invention to provide an improved spectrometer with which a multichannel capability can be achieved inexpensively and to provide a corresponding method of operating such a spectrometer.

This object is satisfied by a spectrometer having the features of claim 1 and by a method having the features of claim 8.

The spectrometer in accordance with the invention has a first light source which generates light radiation in a first wavelength range, a second light source which generates light radiation in a second wavelength range, a mirror unit for deflecting the light radiation of the two wavelength zones into a measurement path, wherein the radiation of both wavelength ranges runs through the measurement path on the same optical path, a detector for detecting the radiation running through the measurement path and an evaluation unit for evaluating the radiation incident on the detector and for determining a concentration of a measurement gas component present in the measurement path. In accordance with the invention, the mirror unit is configured as a micromirror array, with a single micromirror each only deflecting a portion of the radiation, which means that the beam diameter of the light beam incident at the mirror array covers a plurality of the individual micromirrors.

Such micromirror arrays are generally known and are also called MEMS (microelectromechanical system) mirror arrays or areal light modulators or DLPs (digital light processors) or DMMDs (digital micromirror devices) or SLMs (spatial light modulators). All these devices have the common feature that a plurality of micromirrors are combined to form a mirror array and a deflection of a light beam takes place by means of the number of micromirrors. Only the terms micromirror array and micromirror are therefore used in the following.

The main advantage of a spectrometer in accordance with the invention is that a multichannel capability is achieved with high flexibility and low additional costs (for example, in comparison with a provision of parallel measurement channels and thus a doubling of the optical components). In this respect, the construction space requirement is only slightly larger and the light losses are substantially smaller than in known multichannel spectrometers. The wavelength selection takes place by switching over from one channel to another, with the switchover taking place by the micromirror array. The light sources, e.g. lasers, can thereby remain in the thermally tuned state, which ultimately benefits the light intensity stability and spectral stability and thus the reliability and accuracy of the spectrometer. The switchover between the channels can take place very fast with the micromirror array and can take place at a high clock speed without any losses. A further advantage is that the spectrometer does not have any moving parts.

The time access to the measurement channels can take place simply by a suitable programming of the control of the micromirror array. This means a high flexibility in the operation and application of the spectrometer with a small effort and/or expense.

A further advantage of the spectrometer in accordance with the invention is that although at least two optical measurement channels are present, only one measurement path is present in which consequently only one measurement cell for a process gas has to be present. Only one process inlet for the one measurement cell is thus necessary.

Further advantages result from the embodiments and further developments in accordance with the dependent claims.

The advantage that the light sources can remain in the thermally tuned state during the operation of the spectrometer has a particularly advantageous effect when the light sources are configured as lasers since their output power and spectrum frequently depend on the temperature.

In a further development of the invention, the light sources can be spectrally continuously tuned in their respective wavelength ranges so that the spectrometer is configured for TDLS (tunable diode laser spectroscopy). Special advantages are shown here in particular since, on the one hand, very narrow-band lasers can be used for TDLS and, in addition, it is possible to switch to and fro between different wavelength ranges. TDLS can thus be measured at different absorptions of the measurement gas so-to-say simultaneously with one single spectrometer. A plurality of TDLS spectrometers are thus so-to-say combined to form one single spectrometer by the invention.

It is sensible and advantageous for the operation of the spectrometer in two wavelength ranges to leave the light sources in the thermally tuned state and to operate the deflection in time multiplex so that the radiation of both wavelength ranges is alternately deflected into the measurement path. The spectrum of the gas to be measured can thus record the spectrum of the gas to be measured in both wavelength ranges "so-to-say" simultaneously.

The micromirrors of the mirror array can particularly advantageously be individually controlled. A freely adjustable geometrical portion of a light beam can then be directed into the measurement path, for example, and thus onto the detector so that different intensities and intensities determined by the geometrical portion are incident on the detector and a linearity check of the detector is thus possible. This linearity check can take place without any special settings or additional optical elements.

In a very analog manner, a homogeneity measurement of the light beam incident at the detector via the mirror array can be carried out.

In a further development of the invention, additional beam-conducting or beam-shaping optical elements are present in the beam path between the beam source and the detector.

The method in accordance with the invention for operating the spectrometer comprises the following steps:
a) Generating a first light beam in a first wavelength range with a first light source;
b) Generating a second light beam in a second wavelength range with a second light source;
c) Deflecting both light beams by means of a micromirror array, with an individual micromirror only deflecting a portion of the radiation into a measurement path;
d) Detecting the radiation running through the measurement path using a detector; and
e) Evaluating the detected light and determining a concentration of a measurement gas component present in the measurement path.

Provision can be made in this respect that the light beams of the light sources are each deflected into the measurement path with time variability, that is, for example, in a time-alternating manner with a specific clock speed, wherein the time portions of the light of the two light sources in one cycle (period) are of the same amount. On the other hand, it may also be sensible in specific applications to select the time portions differently. It would also be conceivable not to provide any periodic switchovers between the two light sources, but rather to control the mirror array such that respective light of a specific wavelength passes through the measurement path with a predefined duration.

The advantages of this process are the same as the ones already explained above in connection with the spectrometer.

Figure 2:
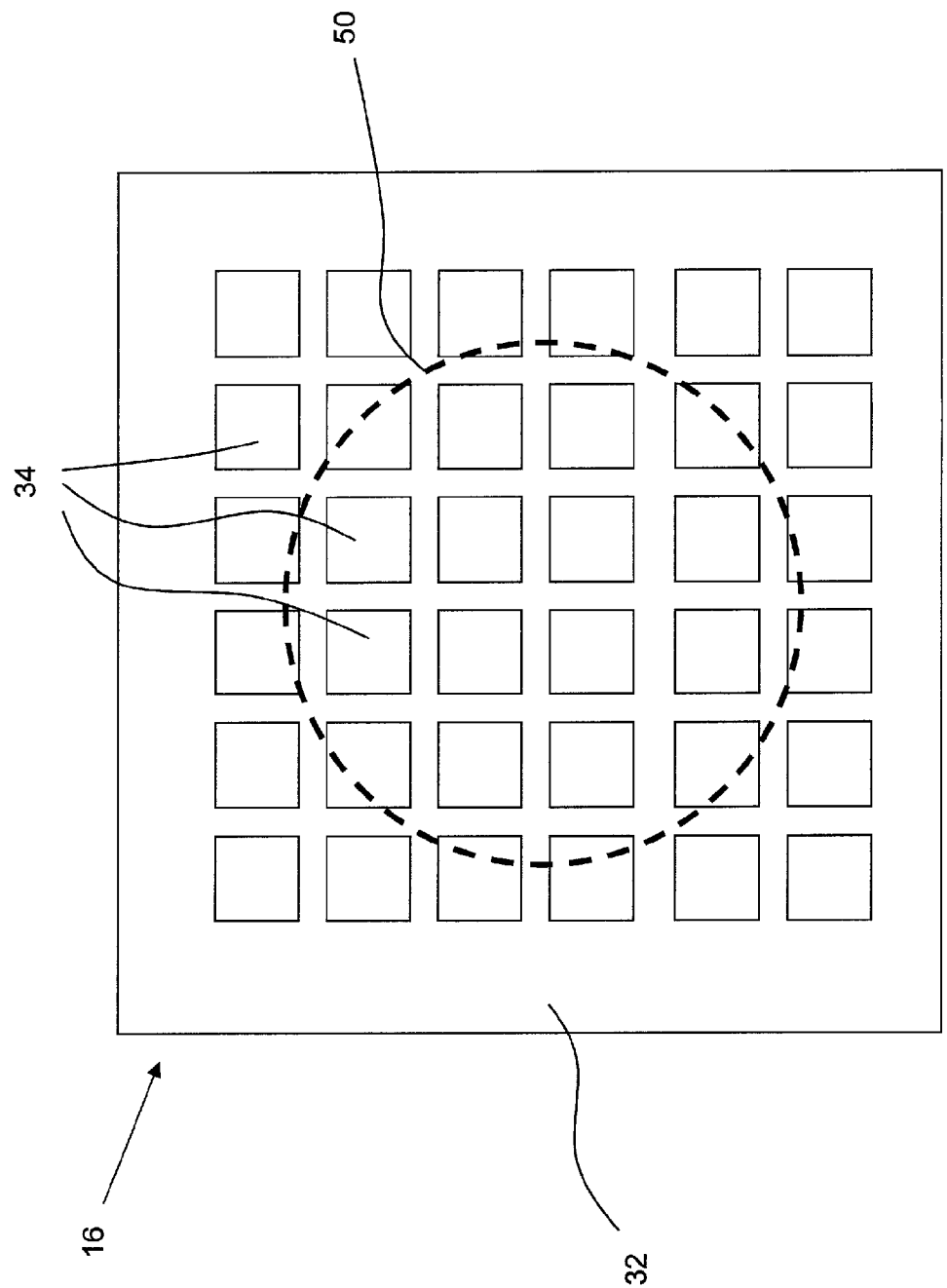

The invention will be explained in detail in the following with reference to an embodiment and to the drawing. There are shown in the drawing:

FIG. 1 a schematic representation of the spectrometer in accordance with the invention;

FIG. 2 a schematic plan view of the micromirror array; and

Figure 3:
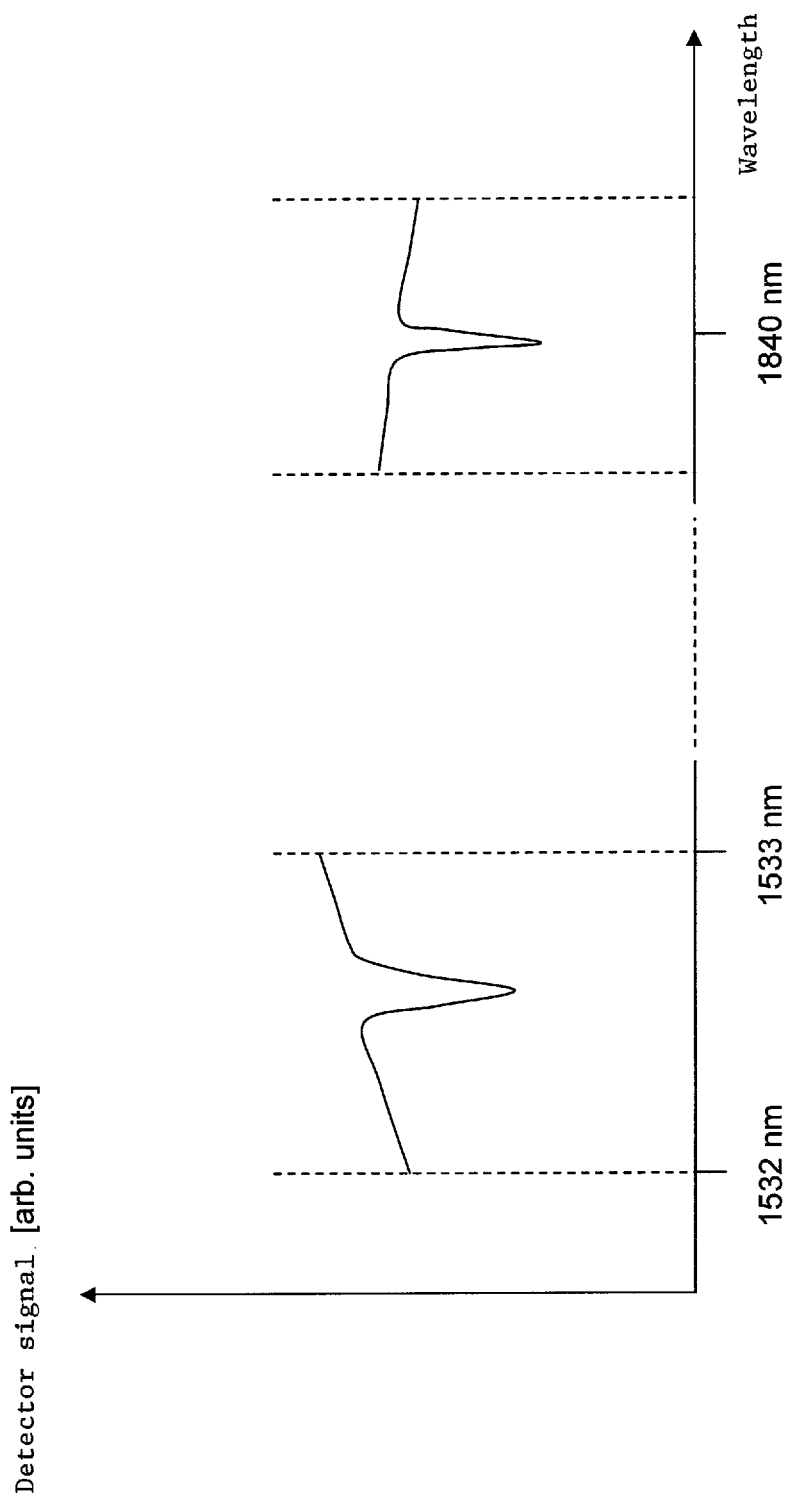

FIG. 3 a qualitative schematic representation of the detector signal in two exemplary wavelength ranges.

A spectrometer 10 in accordance with the invention comprises a first light source 12, a second light source 14, a mirror unit 16, a measurement path 18, a detector 20 and an evaluation unit 22.

The first light source 12, which is preferably a tunable laser diode (TDL), generates a light radiation 24 in a first wavelength range, for example between 1532 and 1533 nm. The second light source 14, which is likewise preferably a tunable laser diode, generates a second light radiation 26 in a second wavelength range, for example around 1840 nm. By positioning a respective optics 28 or 30 in front of the first or second light source respectively, the first light beam 24 comprises parallel light and the light beam 26 likewise. The light beam 24 is, however, not parallel to the light beam 26 since both light sources 12 and 14 direct their light beam 24 and 26 respectively to the same mirror unit 16.

The mirror unit 16 is configured as a micromirror array 32. The micromirror array 32 has individual micromirrors 34 which can be controlled individually via a suitable control unit 36, that is can be individually aligned.

The micromirror array 32 deflects both the light beam 24 and the light beam 26 in the same direction, and indeed in the direction of a concave mirror 38, so that the light beams 24 and 26 cover the same optical distance from the micromirror array 32 via the concave mirror 38 to the detector 20. The light beams are deflected by the concave mirror 38 into the measurement path 18 and are focused on the detector 20 by a receiving lens 40 after running through the measurement path 18.

A measurement gas 42 having at least one measurement gas component whose concentration is to be measured is located in the measurement path 18. The measurement gas 42 can be introduced into the measurement path 18 in a measurement cell, not shown, for which purpose the measurement cell would then have to have corresponding windows through which the light beams could enter.

The detector signals are conducted via a line 44 to the evaluation unit 22 and are evaluated there and are either shown on a suitable display 46 or are output via an output, not shown. The evaluation unit 22 simultaneously contains a control for the light sources 12 and 14 to activate them and to tune them in their respective wavelength ranges.

The first light source 12 is, for example, tuned from 1532 nm to 1533 nm for an absorption measurement and the signal is simultaneously picked up at the detector 20 by the evaluation unit 22. If there is an absorption by a measurement gas component in the wavelength, an absorption takes place as is shown by way of example in FIG. 3. The light source 14 can be tuned in the same way and the corresponding detector signal can be simultaneously recorded so that a spectrum is recorded such as is shown by way of example in FIG. 3 when absorption is present in this wavelength range. An absorption at 1840 mm is shown by way of example in FIG. 3.

So that the light beams 24 or 26 respectively are conducted on the same optical path after deflection by the micromirror array 32, the individual micromirrors 34 impacted by the light beams have to be controlled in a suitable manner so that their alignment effects the desired deflection. This control takes place by the named control unit 36 which is programmed in a suitable manner for this purpose. In this manner, a fast switchover can take place at a high clock speed between different positions of the micromirrors 34 so that, in a first clock interval, light beams 24 of the first wavelength range are deflected into the measurement path and, in a second clock interval, the light beams 26 of the second wavelength range are deflected into the measurement path. In this manner, a very fast switchover can take place between the two wavelength ranges and thus the two absorption spectra of the two wavelength ranges can so-to-say be recorded simultaneously.

A plan view of the micromirror array 32 having the individual micromirrors 34 is shown schematically in FIG. 2. A light spot 50 is likewise shown such as is produced on the array by the light beams 24 and 26. The light beams therefore cover a plurality of the micromirrors 34 so that on an individual control of the micromirrors 34 also only a portion of the respective light beam could be deflected and thus reach the detector 20. In this manner, on the one hand, the light intensity in the measurement path or the intensity of the light incident at the detector can be changed in that more or less micromirror array 34 directs the light onto the concave mirror 38 and thus onto the detector 20. In this manner, a linearity check of the detector 20 can take place in that namely the light intensity is "run through" in this manner and the detection reaction is evaluated.

Furthermore, the homogeneity of the light spot 50 and thus the homogeneity over the cross-section in the measurement path can thus also be determined. For this purpose, individual micromirror arrays 34 direct their portions into the measurement path and thus onto the detector 20 so that ultimately the homogeneity of the light spot 50 can be determined in the evaluation unit 22 from which the control of the micromirrors 34 takes place via the control unit 36 and which thus knows which micromirror is directing its light onto the detector and which is simultaneously reading in the detector signals. The resolution at which this homogeneity can be determined depends on the size of the micromirrors 34.

The invention claimed is:

1. A spectrometer comprising:
   a first light source (12) generating light radiation (24) in a first wavelength range at a first optical path;
   a second light source (14) generating light radiation (26) in a second wavelength range at a second optical path;
   a mirror unit (16) for deflecting the light radiation (24, 26) in the first and second wavelength ranges into a measurement path (18), wherein the radiation (24, 26) of both wavelength ranges runs through on the first and the second optical path which are the same;
   a detector (20) for detecting the radiation (24, 26) running through the measurement path (18); and
   an evaluation unit (22) for evaluating the radiation (24, 26) incident at the detector (20) and for determining a concentration of a measurement gas component present in the measurement path (18), wherein the mirror unit (16) is configured as a micromirror array (32) and wherein a single micromirror (34) only deflects a portion of the radiation (24, 26).

2. The spectrometer in accordance with claim 1, wherein the light sources are configured as lasers.

3. The spectrometer in accordance with claim 1, wherein the light sources are configured as spectrally tunable in their respective wavelength ranges.

4. The spectrometer in accordance with claim 1, wherein the light sources are operated in the thermally tuned state and the deflection is operated in time multiplex so that the radiation of both wavelength ranges is alternately deflected into the measurement path.

5. The spectrometer in accordance with claim 1, wherein the micromirrors of the mirror array can be controlled individually.

6. The spectrometer in accordance with claim 1, further comprising additional beam-conducting or beam-shaping optical elements arranged in a beam path between a beam source and the detector.

7. The spectrometer in accordance with claim 1, further comprising additional beam-conducting or beam-shaping optical elements arranged in the optical path between the light sources and the detector.

8. A method of operating a spectrometer comprising the steps of:
   a) generating a first light beam in a first wavelength range with a first light source;
   b) generating a second light beam in a second wavelength range with a second light source;
   c) deflecting both light beams by means of a micromirror array, with an individual micromirror only deflecting a portion of radiation of the light beams into a measurement path;
   d) detecting the radiation of the light beams running through the measurement path using a detector; and
   e) evaluating the detected light and determining a concentration of a measurement gas component present in the measurement path.

9. The method in accordance with claim 6, wherein the micromirrors are controlled individually.

10. The method in accordance with claim 9, wherein the light power deflected into the measurement path is determined and regulated in that the micromirrors are controlled such that only a portion of the light corresponding to the desired light power moves into the measurement path.

11. The method in accordance with claim 10, wherein a linearity check of the detector is carried out with it.

12. The method in accordance with claim 9, wherein the micromirrors are controlled such that only respective geometrical part regions of the cross-section of one of the two light beams are deflected into the measurement path and thus a homogeneity measurement of the corresponding light beam is carried out.

13. The method in accordance with claim 8, wherein the light beams of the light sources are each deflected into the measurement path in a time variable manner.

* * * * *